United States Patent [19]

Bryan, Jr.

[11] 4,054,332
[45] Oct. 18, 1977

[54] ACTUATION MEANS FOR ROLLER GUIDE BUSHING FOR DRILL RIG

[75] Inventor: John F. Bryan, Jr., Dallas, Tex.

[73] Assignee: Gardner-Denver Company, Dallas, Tex.

[21] Appl. No.: 682,510

[22] Filed: May 3, 1976

[51] Int. Cl.² .......................... F16C 33/04; F16C 1/28
[52] U.S. Cl. ..................................................... 308/4 A
[58] Field of Search ............. 308/4 R, 6 R, 237, 3 R, 308/3 A, 4 A, 8.2, 237 R, 238

[56] References Cited

U.S. PATENT DOCUMENTS

| | | | |
|---|---|---|---|
| 3,194,611 | 7/1963 | Mahony | 308/4 R |
| 3,367,690 | 2/1968 | Federspill | 308/237 |

Primary Examiner—Richard A. Bertsch
Attorney, Agent, or Firm—Richards, Harris & Medlock

[57] ABSTRACT

A drill pipe bushing for stabilizing a drill pipe at the mouth of the well during drilling which includes a frame surrounding the drill pipe axis and a plurality of support arms supported from the frame in a circular array about the drill pipe. The support arms are pivotable about an axis substantially parallel to the axis of the drill pipe. Rollers are attached to each support arm with the axis of the rollers normally parallel to the axis of the drill pipe. A rotatable member encircles the drill pipe axis and a plurality of toggle arms are secured between the rotatable member and the end of a corresponding support arm remote from the connection of the support arm to the frame. Structure is provided for rotating the rotatable member relative to the frame thereby moving the toggle arms and the support arms to move the rollers into engagement with or away from the drill pipe. The rotational axis of the rollers become canted upon both rotation and translation of the drill pipe.

18 Claims, 7 Drawing Figures

ACTUATION MEANS FOR ROLLER GUIDE BUSHING FOR DRILL RIG

FIELD OF THE INVENTION

This invention relates to a drill pipe bushing for use in limiting the lateral movement of drill pipe as it rotates and translates into and out of a well. More particularly, the invention relates to rotational mechanism to translate rollers into and out of contact with a drill pipe bushing.

PRIOR ART

Drilling of blast holes for surface mining operations and drilling or reworking of oil and gas wells, involves rotation and vertical translation of a string of drill pipe which is caused to penetrate the earth formations. Drill pipe is rotated by transmitting rotary motion to the upper end of the last section of drill pipe or by means of a rotary table which applies a rotational force along the drill pipe length intermediate of the ends of the pipe section. In either case the pipe passes through a bushing located near the entry of the pipe into the formation being drilled. The bushing stabilizes the pipe by limiting lateral movement during the drilling operation.

Heretofore, such bushings have comprised a rigidly supported steel sleeve closely conforming to the outer circumference of the drill pipe to prevent lateral movement of the pipe. Such rigid sleeve type support structures have been found to be unsatisfactory for several reasons. Because the sleeve is fixed, substantial friction results between the sleeve and the drill pipe resulting in excessive wear. Such bushings have only limited life. Wear resulting from the continuous sliding and rotating contact between the drill pipe and the sleeve type bushing often results in wearout of the sleeve within a matter of days. Friction further causes wear on the drill pipe thereby limiting its life.

Proper stabilization of the pipe during the drilling operations requires the bushing to closely conform to the outer circumference of the drill pipe. Due to the varying diameters of drill pipe used and because the drill bit and stabilizers between pipe sections are necessarily larger than the diameter of the drill pipe, the stabilizing bushing must be capable of adjustment or removal in order to accommodate the varying diameters of drill pipe and to permit the passage of the drill bit and stabilizers therethrough. Thus, the conventional sleeve type bushing must be repeatedly removed and remounted in order to permit the drill bit or stabilizers to be drawn past the bushing. This naturally slows the drilling process thereby adding additional expense to the operation.

Improvements to the fixed sleeve type bushings for controlling the lateral movement of the drill pipe include the application of contoured cylinders mounted around the drill pipe to restrain the lateral movement of the pipe as it enters the formation to be drilled. Examples of these systems are found in U.S. Pat. Nos. 3,194,611 to P. M. Mahoney and 1,366,571 to L. Larsen. These systems have generally been unsatisfactory in that their design requires the independent adjustment of each contoured cylinder thereby requiring prohibitive amounts of time to adjust the bushing to permit the passage of joints or the drill bit through the bushing during removal or insertion of the drill pipe. Prior art systems have further been limited to providing contoured rollers which rotate about a fixed axis thereby introducing resistance, and resultant friction therefrom, to rotation of the drill pipe during drilling.

Thus, there is apparent the need for a drill pipe bushing capable of providing lateral stability to the drill pipe as it moves into the formation with the capability of being quickly and easily adjusted to the outer circumference of the drill pipe and capable of being quickly retracted in order to permit the passage of enlarged portions of the drill string past the bushing during the drilling operation.

SUMMARY OF THE INVENTION

The present invention comprises a drill pipe bushing for laterally stabilizing the drill pipe at the mouth of the well during the drilling operation. The bushing is readily adjustable to conform to the outer circumference of varying drill pipe sections. Castering rollers preferably are employed to facilitate both rotation and translation of the pipe along its drill axis during the drilling operation. In one embodiment, the drill pipe bushing included a frame surrounding the drill pipe and a plurality of support arms supported from the frame in a circular array about the drill pipe. The support arms pivot about an axis substantially parallel to the axis of the drill pipe. Rollers are attached to each support arm with the axis of the rollers normally parallel to the axis of the drill pipe. Structure is provided for simultaneously rotating the support arms to force the rollers against the drill pipe thereby supporting the pipe against lateral movement.

Structure for rotating the support arms includes a rotatable ring encircling the rollers and a plurality of toggle arms each secured between the ring and the end of a corresponding support arm remote from the connection of the support arm to the frame. Structure is provided for rotating the ring relative to the frame thereby moving the toggle arm to effect the geometry of the support arm and toggle arm combination. In this way, the rollers attached to the support arm may be simultaneously moved toward or away from the drill pipe by rotating the ring relative to the frame.

In accordance with another aspect of the invention, hydraulic cylinders, attached between the ring and the frame, upon extension rotate the ring in a first direction. Contraction of the cylinders rotates the ring in a reverse direction. As the ring is rotated in the first direction, the support arms are rotated inwardly about their point of connection to the frame, thereby engaging the array of rollers against the side wall of the drill pipe. As the ring is rotated in the reverse direction, the rollers are withdrawn from the side wall of the drill pipe thereby permitting the passage of enlarged portions of the drill string, such as the drill bit or joints, therethrough.

In accordance with still another aspect of the invention, the support arms are supported on the frame from points on a circle having its center on the drill axis. The rollers are attached to the support arms an equal distance from the point of support of the support arms from the frame. With this geometry and by simultaneously rotating the support arms, as by using the ring and toggle arm arrangement, the rollers are maintained at an equal distance from the axis of the drill pipe throughout their movement toward or away from the drill pipe. Thus, as the rollers of the bushing are engaged against the outer wall of the drill pipe, the drill pipe is automatically aligned along a predetermined drill axis.

DESCRIPTION OF THE DRAWINGS

For a more complete understanding of the present invention and for further details and advantages thereof, reference is now made to the following description taken in conjunction with the accompanying drawings in which:

FIG. 1 shows a bushing mounted on a drill rig;

DESCRIPTION OF THE PREFERRED EMBODIMENTS

Figure 6:
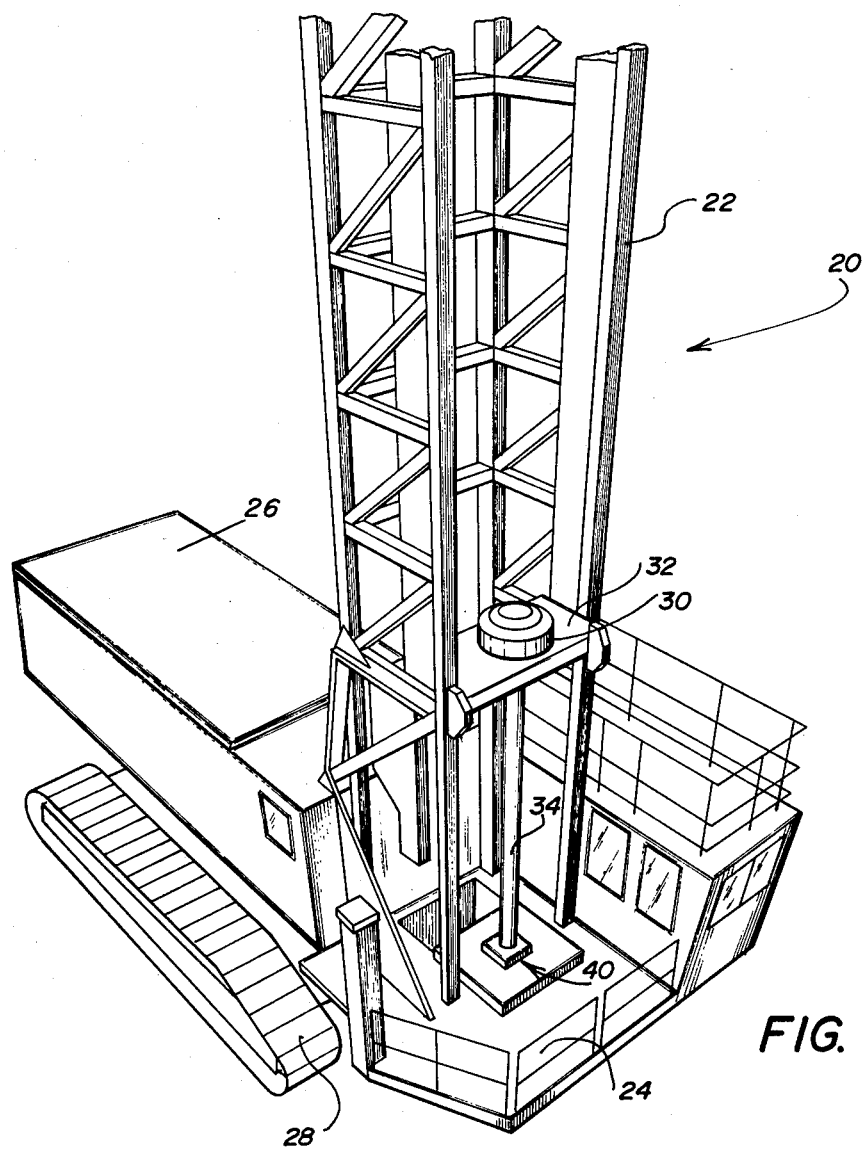
FIG. 6 is a sectional view taken along line 6—6 of FIG. 2.

FIG. 1 illustrates a drilling rig incorporating a guide bushing. Drilling rig 20 includes a mast 22 mounted on a main deck 24. Rig 20 illustrated in FIG. 1 is a movable unit capable of being relocated from one area to another by a prime mover enclosed in housing 26 which drives tracks 28. A power swivel 30 is mounted for movement on a platform 32 which moves vertically within mast 22. Power swivel 30 engages drill pipe 34 and transmits rotation to the drill pipe for the drilling operation. Platform 32 translates within mast 22 along its longitudinal axis to control the movement of drill pipe 34 into and out of the well. A drill pipe bushing assembly 40 is mounted on deck 24 near the mouth of the well. While FIG. 1 illustrates the drill pipe bushing being positioned on deck 24, it will be understood that the bushing may be positioned below deck 24 and immediately at the mouth of the well being drilled or at some position above deck 24.

The function of bushing 40 can be readily appreciated by referring to FIG. 1. Rotation of the drill pipe is transmitted at the upper end of drill pipe 34 by power swivel 30. Thus, bushing 40 is positioned a distance from the rotational power unit and adjacent the mouth of the well in order to provide lateral stability to the drill pipe and to guide the pipe as it progresses into the well.

Figure 2:
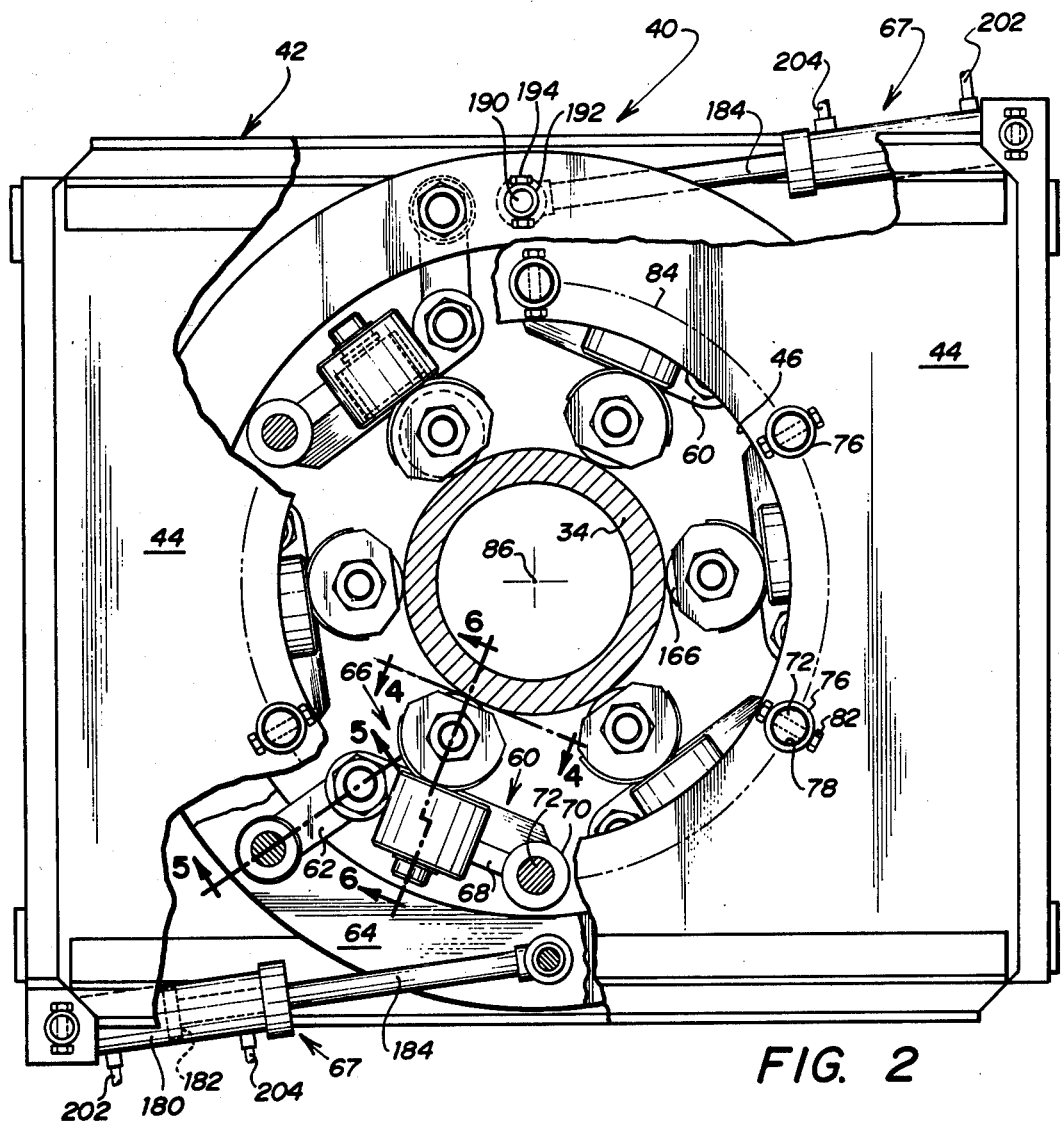
FIG. 2 illustrates a partially broken away plan view of a bushing embodying the present invention.
Figure 3:
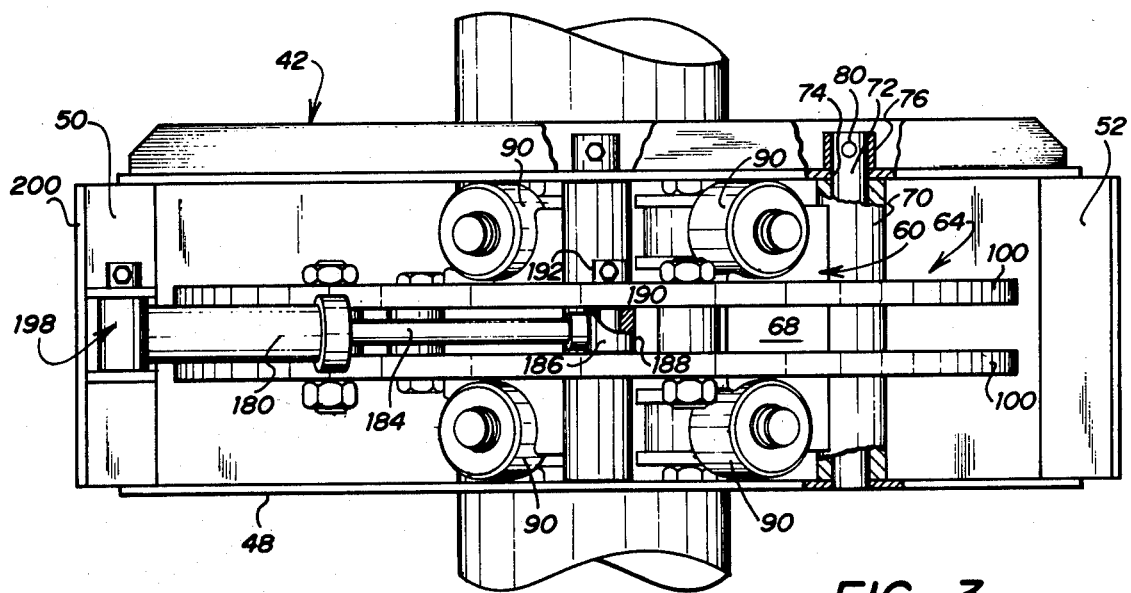
FIG. 3 is a partially broken away side elevation view of the drill pipe bushing of FIG. 2.

FIG. 2 is a partially broken away plan view of bushing 40, and FIG. 3 is a side elevation view of bushing 40. Bushing 40 includes a frame 42 having an upper plate 44 with a circular opening 46 therein. Frame 42 further includes a lower plate 48 having a circular cutout therein corresponding to cutout 46 therein. Opening 46 and the corresponding opening in lower plate 48 are of sufficient size to receive the drill string including the drill pipe, stabilizers and drill bit therethrough. Upper and lower plates 44 and 48 are maintained in a parallel spaced relationship by side members 50 and 52 secured therebetween.

Referring to FIGS. 2 and 3, bushing assembly 40 includes a support arm 60 having one end attahced to frame 42 and the opposite end attached to a toggle arm 62. Toggle arm 62 is in turn attached at its end opposite attachment to support arm 60 to a ring assembly 64 extending around the drill pipe 34 and outside of each support arm 60. A roller assembly 66 is attached to each support arm 60 which engages drill pipe 34 by the adjustment of ring assembly 64 relative to frame 42 as will hereinafter be described in greater detail. A pair of double acting hydraulic cylinders 67 are attached between ring assembly 64 and frame 42 in order to control the rotation of the ring assembly relative to frame 42.

Referring still to FIGS. 2 and 3, it may be seen that support arms 60 include a plate 68 attached at one end to a sleeve 70. A shaft 72 extends upwardly from lower plate 48 or frame 42 through sleeve 70 of arm 60 and through an aperture 74 in upper plate 44. A collar 76 mates over the upper end of shaft 72. Collar 76 has an aperture 78 which aligns with an aperture 80 through the upper end of shaft 72 for receiving a pin 82 therethrough to secure the shaft 72 to upper plate 44. Thus, arm 60 is rotatable relative to frame 42 about the vertical axis of shaft 72.

As may be seen from FIG. 2, shafts 72 are equally spaced one from the other and, in the embodiment illustrated, are spaced on a circle 84 having its center 86 aligned with the predetermined drill axis of pipe 34.

Figure 4:
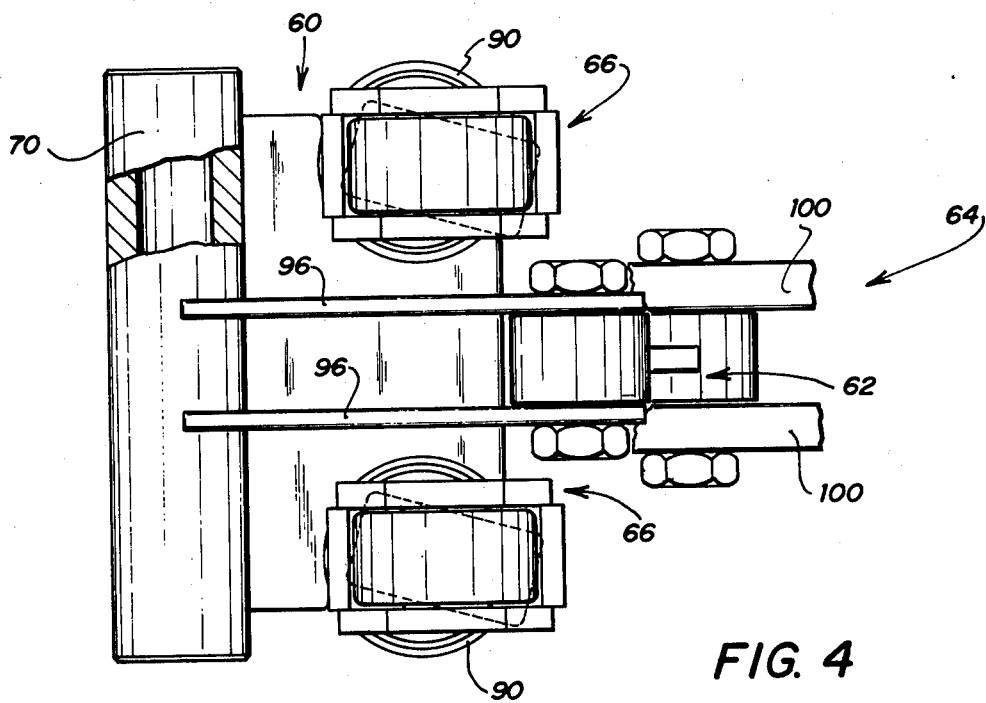
FIG. 4 is a sectional view taken along lines 4—4 of FIG. 2.

As is best shown in FIGS. 2 – 4, each arm 60 includes a pair of cup-like housings 90 integral with plate 68 for rotatably receiving roller assemblies 66 therein. Support arm 60 is further adapted with ribs 96 which extend from sleeve member 70 across support arm plate 68. Ribs 96 are attached to sleeve member 70 and plate 68 by suitable means such as by welding. Ribs 96 further extend beyond plate 68 to receive one end of a toggle arm 62.

Figure 5:
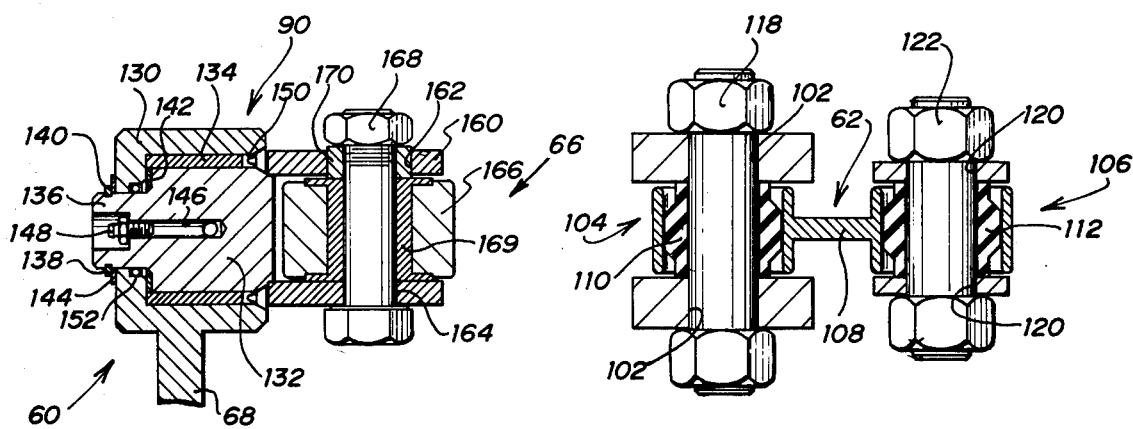
FIG. 5 is a sectional view taken along line 5—5 of FIG. 2.

Referring to FIGS. 3 – 5, ring assembly 64 consists of a pair of ring members 100 having a number of apertures 102 therein equal to the number of support arm and toggle arm assemblies attached thereto. Apertures 102 are equally spaced about ring assembly 64. Ring members 100 are maintained in a parallel spaced apart relationship by toggle arms 62. As can be seen in FIG. 5, each toggle arm 62 consists of cylindrical sleeves 104 and 106 connected by a rigid web 108. Sleeves 104 and 106 are fitted with bushings 110 and 112, respectively. Each sleeve 104 and bushing 110 is alignable with apertures 102 in ring members 100 and is suitably engaged thereto by bolt and nut assembly 118. Likewise, sleeve 106 and bushing 112 on the opposite end of each toggle arm are alignable with apertures 120 through the ends of ribs 96 of support arms 60 and are attached thereto by a suitable bolt and nut assembly 122.

The connection of support arms 60 and ring members 100 of ring assembly 64 by toggle arms 62 is illustrated in FIG. 4 wherein a toggle arm 62 is shown interconnecting the ends of ribs 96 of support arm 60 to ring members 100 of ring assembly 64. Therefore, it will be appreciated that ring assembly 64 is suspended between upper and lower frame plates 44 and 48 by its connection through toggle arms 62 and support arms 60 to upper and lower frame plates 44 and 48.

FIG. 6 illustrates a sectional view taken along line 6—6 of FIG. 2 and shows roller assembly 66 as it mates with housing 90 integral with support arm 60. It will be understood that the roller assembly 66 illustrated in FIG. 6 is typical of the two roller assemblies attached in spaced apart relation along the axis of the drill pipe to each of support arms 60. Housing 90 includes a casing 130 which receives a trunnion 132 rotatable on a bushing 134 positioned between trunnion 132 and casing 130. Casing 130 has an aperture in the wall thereof for receiving the extended end 136 of trunnion 132. End 136 is adapted with an annular groove 138 which receives a snap ring 140 for retaining trunnion 132 within casing 130. Spacer rings 142 and 144 are positioned on either side of the back wall of casing 130 and between snap ring 140 and trunnion 132. These rings facilitate the rotation of trunnion 132 within casing 130.

Trunnion 132 has a lubrication port 146 formed therein for carrying lubricant to bushing 134 thereby facilitating the rotation of trunnion 132. A lubrication fitting 148 is received within lubrication port 146 and is adapted to permit the injection of lubricant into port 146. Seals 150 and 152 positioned between casing 130 and trunnion 132 seal the annular area filled by bushing 134 and retain the lubricant within the area.

Roller assembly 66 includes parallel arms 160 which extend from and are attached to trunnion 132. Arms 160 are formed with apertures 162 and 164, respectively. A roller 166 is positioned between arms 160 and is retained for rotation therebetween by an appropriate nut and bolt assembly 168. Roller 166 is fitted with a bearing 169 on which roller 166 rides. A spacer 170 is positioned between aperture 162 and nut and bolt assembly 168 and bears between the nut of bolt assembly 168 and bearing 169.

Referring now to FIGS. 2 and 3, the rotation of ring assembly 64 relative to frame 42 is controlled by the extension and retraction of hydraulic cylinders 67. Cylinders 67 include a cylinder housing 180, a piston 182 and a piston rod 184 attached to piston 182 and extending from cylinder housing 180. A fitting 186 is attached to the end of each piston rod 184 remote from cylinder housing 180. Each fitting 186 includes a sleeve portion 188 which receives a shaft 190 extending upwardly from lower ring member 100. Shafts 190 are attached at their lower ends to the upper surface of lower ring member 100 by any suitable means such as welding. Upper ring member 100 is formed with apertures therein for receiving the upper end of each shaft 190. A collar 192 is positioned over the upper end of each shaft 190 and a pin 194 (FIG. 2) is received through apertures in collar 192 and the upper end of shafts 190 to secure the shafts and sleeves 188 between ring members 100. Thus, fittings 186 are free to rotate about shafts 190 as hydraulic cylinders 67 are actuated. Hydraulic cylinder housings 180 are similarly rotatably attached to frame 42 by a fitting 198 and bracket 200. FIG. 2 illustrates the use of two hydraulic cylinders 67 spaced on opposite sides of the bushing assembly. However, it will be understood that one or more hydraulic cylinders may be employed to rotate ring 64 relative to frame 42 as desired.

Hydraulic lines 202 and 204 carry hydraulic fluid to and from hydraulic cylinders 67 in order to selectively extend and retract piston rods 184. As piston rods 184 are extended, ring assembly 64 is rotated relative to frame 42 shortening the distance between the point of attachment of toggle arm 62 and the point of attachment of the corresponding support arm 60 to frame 42. As rotation progresses, support arms 60 are rotated inwardly toward drill pipe 34 until rollers 166 of roller assemblies 66 engage the outer surface of the drill pipe.

Figure 7:
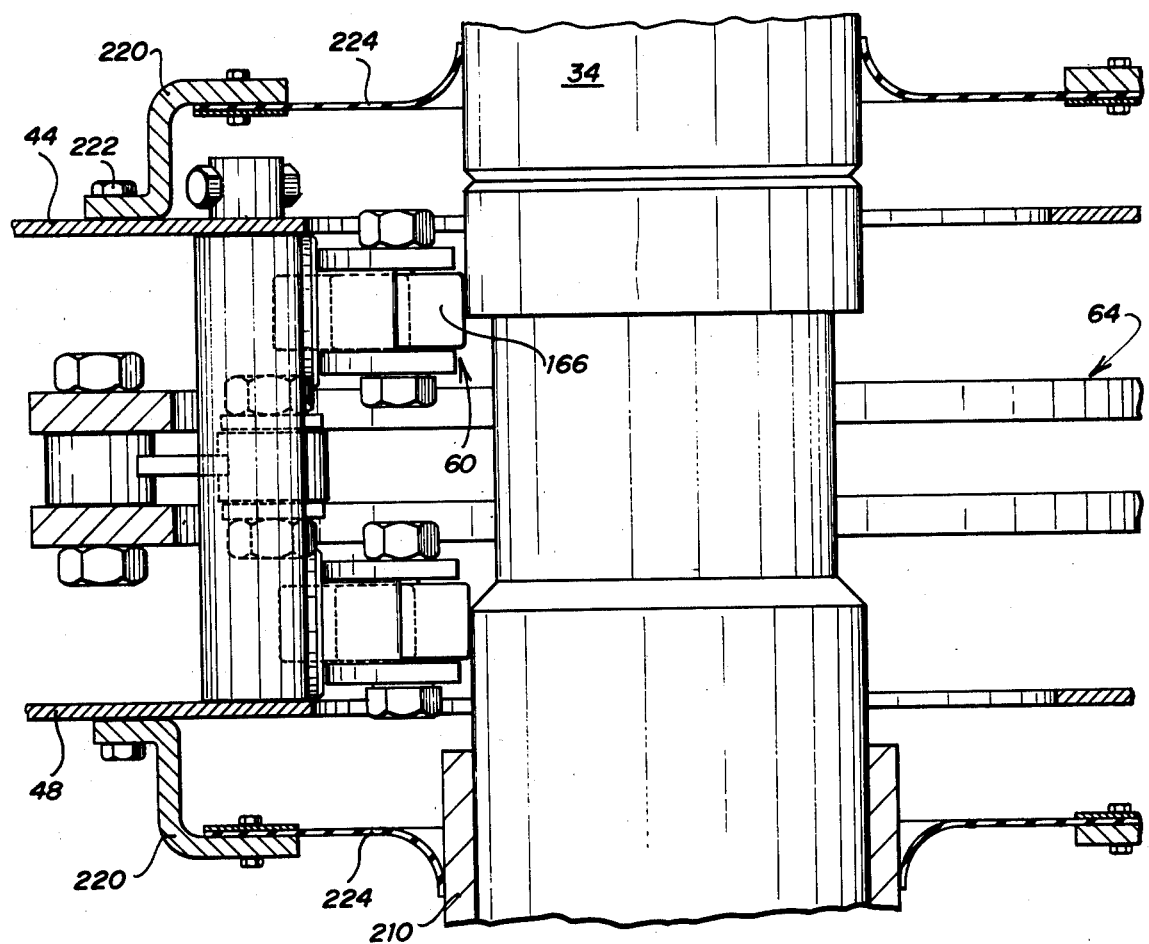
FIG. 7 is a sectional view taken along line 7—7 of FIG. 2.

The engagement of rollers 166 against the outer surface of drill pipe 34 is illustrated in FIG. 7. During normal operation, rollers 166 of roller assemblies 66 are engaged against the outer circumference of the drill pipe 34. It will be noticed that the spaced apart relationship of the roller assemblies on each support arm provides for bridging grooves in the drill pipe. During initial drilling phases where the drill pipe is rotating with little vertical movement, the axes of the rollers 166 will generally be vertical as illustrated in FIG. 7. As downward movement of the drill pipe occurs, roller assemblies 66 are free to caster or rotate relative to support arms 60 about the axes of trunnions 132 in order to track the downward movement of the drill pipe. This castering reduces or eliminates the sliding friction which would otherwise occur between the drill pipe and rollers 166 of roller assemblies 66. The canted angle which roller assemblies 66 will assume is illustrated by the dotted lines shown in FIG. 4. Thus, the roller assemblies not only facilitate the rotation of the drill pipe but also caster to track the surface of the drill pipe as the pipe is lowered and raised along its drill axis.

At times lateral support available from bushing 40 is not desired. For example, enlarged sections must pass the bushing assembly 40, i.e. collar 210 of FIG. 7. In such a case, the hydraulic cylinders 67 are actuated to retract piston rods 184 thereby rotating ring assembly 64 relative to frame 42. This reverse rotation of ring assembly 64 increases the distance between the point of connection of toggle arms 62 to ring assembly 64 and support arms 60 to frame 42. As a result, support arms 60 are rotated away from drill pipe 34 and roller assembly 66 are retracted from drill pipe 34 as shown in the dotted configuration illustrated in FIG. 7. In this way, the enlarged sections of the drill string may pass bushing assembly 40 without difficulty.

It may now be further appreciated that in bushing 40 illustrated in FIGS. 1-7, the points of connection of support arms 60 to frame 42 are equally spaced about the circumference of ring members 100. Likewise, with respect to each support arm and roller assembly combination, the dimension between this point of connection and the corresponding roller 166 are equal. Thus, by simultaneously rotating support arms 60, as by the ring assembly and toggle arm configuration hereinabove described, the roller assemblies converge equally toward drill pipe 34 and function to center drill pipe 34 on a predetermined axis center 86. Thus, there is no need for individual adjustment of the separate support arm and roller assembly combinations in order to appropriately position drill pipe 34. Likewise, the lateral support pressure applied by the roller assemblies against drill pipe 34 may be incrementally controlled by the simple rotation of ring assembly 64.

FIG. 7 illustrates brackets 220 suitably attached by bolts 222 to upper and lower plates 44 and 48 of frame 42. These brackets support a flexible dust shield 224 which bears against the outer circumference of drill pipe 34 in order to restrict the flow of debris and other contaminants into the area of the drill pipe bushing assembly.

Thus, in accordance with the present invention, a drill pipe bushing provides lateral stability to drill pipe as it moves into and out of the wall. The bushing is quickly and easily adjusted to the outer circumference of the drill pipe and quickly retracted in order to permit the passage of enlarged sections of the drill string past the bushing during the drilling operation.

Although particular embodiments of the invention have been illustrated in the accompanying drawings and described in the foregoing detailed description, it will be understood that the invention is not limited to the embodiments disclosed, but is capable of numerous rearrangements, modifications, and substitutions of parts and elements without departing from the spirit of the invention.

What is claimed is:

1. A drill pipe bushing comprising:
   a. a plurality of rollers in a circular array with the surfaces of said rollers facing said drill pipe,
   b. a fixed frame and a rotatable member encircling the axis of said drill pipe,
   c. support arms, each said support arm rotatably supporting one of said rollers and having one end pivotally secured to said frame,
   d. toggle arms secured to the free ends of said support arms and attached to said rotatable member, and
   e. means for rotating said rotatable member in either of two senses relative to said frame to move said toggle arm and support arm linkages thereby moving said rollers toward and away from the drill pipe, respectively.

2. The drill pipe bushing of claim 1 wherein at least one end of each toggle arm is carried on a resilient bushing thereby accommodating minor irregularities in the drill pipe cross section.

3. The drill pipe bushing of claim 1 wherein at least one end of each support arm linkage is carried on a resilient bushing thereby accommodating minor irregularities in the drill pipe cross section.

4. The drill pipe bushing of claim 1 wherein said means for rotating said rotatable member comprises:
   an extension and contraction means connected between said frame and said rotatable member for rotating said rotatable members relative to said frame thereby moving said rollers toward and away from said drill pipe.

5. The drill pipe bushing of claim 4 wherein said extension and contraction means is characterized by at least two hydraulic cylinders attached between said frame and said rotatable member.

6. The drill pipe bushing of claim 1 further comprising:
   second rollers with one of said second rollers attached to each of said support arms such that both said first and second rollers may be engaged against the drill pipe by rotating said rotatable member relative to said frame.

7. A drill pipe bushing for guiding a drill pipe during drilling comprising:
   a. a frame surrounding the drill pipe,
   b. a plurality of support arms supported from said frame in a circular array about the drill pipe, said support arnms being pivotable about an axis substantially parallel to the axis of the drill pipe,
   c. rollers attached to each support arm with surfaces of said rollers facing said drill pipe, and
   d. means for selectively rotating said support arms in unison between a first position where said rollers are engaged against the drill pipe and a second position where said rollers are withdrawn from the drill pipe.

8. The drill pipe bushing of claim 7 wherein at least one end of each toggle arm is carried on a resilient bushing thereby accommodating minor irregularities in the drill pipe cross section.

9. The drill pipe bushing of claim 7 wherein at least one end of each support arm linkage is carried on a resilient bushing thereby accommodating minor irregularities in the drill pipe cross section.

10. The drill pipe bushing of claim 9 wherein said support arms are supported on said frame from points on a circle having its center on the drill axis of the drill pipe and wherein said rollers are attached to said support arms an equal distance from the point of support of said arms from said frame such that by simultaneously rotating said support arms said rollers are maintained at an equal distance from the drill axis of the drill pipe.

11. The drill pipe bushing of claim 10 wherein said support arms are equal lengths and said toggle arms are equal lengths such that said ring rotates about a center on the drill axis of the drill pipe.

12. The drill pipe bushing of claim 7 wherein said rotating means includes:
    a rotatable member encircling said rollers,
    a plurality of toggle arms each secured between said ring and the ends of corresponding support arms remote from the connection of said support arms to the frame, and
    means for rotating said rotatable member relative to said frame to move said rollers toward and away from the drill pipe.

13. The drill pipe bushing of claim 12 wherein said means for rotating said rotatable member comprises:
    hydraulic cylinders attached between said ring and said frame such that extension of said hydraulic cylinders rotates said ring in a first direction to move said rollers toward the drill pipe and contraction of said cylinders rotates said rings in a reverse direction to move said rollers away from the drill pipe.

14. A drill pipe bushing for guiding a drill pipe during drilling comprising:
    a. a frame surrounding the drill pipe,
    b. a rotatable member encircling said drill pipe,
    c. a plurality of flexible arms each rotatably attached at one end to said frame in a circular array about the drill pipe and at the opposite end to said rotatable member,
    d. rollers attached to each said arm with surfaces of said rollers confronting said drill pipe, and
    e. means for selectively rotating said rotatable member relative to said frame to bend said arms between a first position where said rollers are engaged against the drill pipe and a second position where said rollers are withdrawn from the drill pipe.

15. The drill pipe bushing of claim 14 wherein each said flexible arm includes:
    a support arm for supporting one of said rollers, and
    a toggle arm rotatably attached to the end of said support arm.

16. The drill pipe bushing of claim 14 wherein said means for rotating said rotatable member comprises:
    an extension and contraction means connected between said frame and said rotatable member for rotating said rotatable member relative to said frame thereby moving said rollers toward and away from said drill pipe.

17. The drill pipe bushing of claim 14 wherein said means for rotating said rotatable member comprises:
    hydraulic cylinders attached between said ring and said frame such that extension of said hydraulic cylinders rotates said ring in a first direction to bend said flexible arm thereby moving said rollers toward the drill pipe and contraction of said cylinders rotates said ring in a reverse direction to straighten said arm thereby moving said rollers away from the drill pipe.

18. The drill pipe bushing of claim 14 further comprising:
    second rollers with one of said second rollers attached to each of said flexible arms such that both said first and second rollers may be engaged against the drill pipe by rotating said rotatable member relative to said frame.

* * * * *